United States Patent Office 3,178,357
Patented Apr. 13, 1965

3,178,357
HYDROCARBON MODERATOR-COOLANTS FOR NUCLEAR REACTORS
James F. Black, Convent Station, and John Mackinnon, Fords, N.J., assignors to Esso Research and Engineering Company, a corporation of Delaware
No Drawing. Filed July 14, 1961, Ser. No. 123,985
5 Claims. (Cl. 176—50)

This invention relates to a process for improving hydrocarbons for use as moderator-coolants in nuclear reactors and the products produced by the process. In particular, it relates to a heat treatment of various materials to improve their stability as moderator-coolants.

Moderators are materials which are placed in a nuclear reactor to slow down newly born neutrons from their original high velocities. A coolant is generally a fluid substance which is used for cooling any part of a reactor in which heat is generated. It can also be used as a heat exchange medium. As used herein the term "moderator-coolant" includes moderators per se, coolants per se, as well as combination "moderator-coolants."

The feasibility of using hydrocarbon fluids as combination moderator-coolants for nuclear reactors has been demonstrated in the Organic Moderator Reactor Experiment (OMRE) currently being operated by Atomics International for the U.S. Atomic Energy Commission. The moderator-coolant used in this reactor is a synthesized mixture of polyphenyls comprising primarily isomers of terphenyls. On prolonged service within a nuclear reactor, degradation products, such as high boiling polymers are formed within the moderator coolant as the result of chemical reactions induced by radiation and by the heat liberated during fission. A buildup of these degradation products within a reactor can cause surface fouling of the fuel elements. Such fouling can cause a local temperature rise which can accelerate the decomposition rate of a moderator-coolant which can ultimately cause damage to the reactor. Severe damage could ultimately result in a shutdown of the reactor. Conventionally, these high boiling polymers, known as "high boilers," and other degradation products are periodically removed from the moderator-coolant by distillation and fresh moderator-coolant is added as makeup.

The instant invention resides in the discovery that certain relatively inexpensive distillate by-products from conventional refinery processes can be suitably modified by an inexpensive process so as to increase their resistance to thermal degradation within a nuclear reactor. Thus the invention presents the advantage of upgrading an inexpensive by-product material so that it is competitive in function to a specially synthesized product, i.e. terphenyl isomers.

In general, the instant invention is carried out by subjecting a hydrocarbon catalytic cycle stock extract to pyrolysis for a certain period and recovering the distillate product from such pyrolysis. Generally, the distillate product recovered is in the boiling range of 600° to 1100° F., e.g. 700° to 900° F. The pyrolysis creates a quantity of an unwanted degradation product which is eliminated in the distillate bottoms. The pyrolysis is carried out by any conventional pyrolysis technique such as visbreaking and thermal cracking. The temperature of pyrolysis can range from 500° to 1100° F., e.g. 600° to 800° F. The material to be pyrolyzed should be held under a pressure from 0 to 1000 p.s.i.g. at the desired temperature for a time of from 0.5 to 72 e.g. 12 to 50 hours.

The preferred by-product distillate material used in this invention obtained from conventional refinery techniques is a catalytic cycle stock extract. As used herein, catalytic cycle stock extracts are obtained from distillates boiling in the gas oil boiling range which are subjected to conventional catalytic cracking. Catalytic cycle stock is that portion of the gas oil which is uncracked. The catalytic cycle stock is then extracted by conventional solvent extraction processes such as phenol extraction, sulfur dioxide, furfural, nitrobenzene, and the like. The solvent extraction separates a paraffinic fraction and a highly aromatic extract. It is the highly aromatic extract which is pyrolyzed in the technique of the invention. The aromatic extract fraction of the catalytic cycle stock preferably boils within the range of about 340° C. to about 550° C. e.g. 700° to 900° F. and comprises aromatic compounds. This boiling range corresponds to the optimum boiling ranges for organic materials used as moderator-coolants. It is preferred, but not essential, that these aromatic extracts of catalytic cycle stocks be further hydrogenated with conventional hydrogenation techniques, such as hydrofining, to reduce the sulfur content of the extract.

Additives may also be incorporated in the improved moderator-coolants of the invention to beneficially influence their behaviour either in storage or in service. Thus, materials can be added to improve radiation, oxidation, or corrosion resistance, to prevent the deposition of sludge or coke on fuel elements and heating exchanger surfaces, and to improve viscosity temperature characteristics.

The invention will be further understood by the following specific example.

EXAMPLE I

A specific aromatic extract of a catalytic cycle stock having the following specifications

| Property: | Aromatic extract of cat. cycle stock |
|---|---|
| Gravity, ° API | 0.2 |
| Viscosity, SSU: | |
| At 100° F. | 423 |
| At 130° F. | 143 |
| At 210° F. | 44 |
| Conradson carbon, wt. percent | 1.70 |
| Pour point, ° F. | --- |
| Aniline point, ° F. | 72 |
| Average boiling point, ° F. | 745 |
| ASTM distillation, ° F.: | |
| 10% off at | 681 |
| 50% off at | 736 |
| 90% off at | 827 |
| Composition (wt. percent): | |
| Paraffins | 3.0 |
| Noncondensed naphthenes | 2.6 |
| Condensed naphthenes | 5.7 |
| Aromatics | 73.0 |
| Aromatic sulfur compounds | 11.7 |
| Nonhydrocarbon fraction | 4.0 |
| Elementary analysis (by weight): | |
| Nitrogen, percent | 2.41 |
| Sulfur | Nil |
| Silicon | Nil |
| Sodium | Nil |
| Magnesium | Nil |
| Calcium | Nil |
| Aluminum | Nil |
| Vanadium | Nil |
| Chromium | Nil |
| Iron | Nil |
| Nickel | Nil | was hydrofined and subjected to two severe pyrolysis treatments. Hydrofining is a process of hydrogenation which is carried out at temperatures of from 500° to 700° F., pressures of 100 to 1000 p.s.i.g. and wherein the feed rate is about 0.5 volume of aromatic extract per volume of catalyst. The catalyst is cobalt molybdate on alumina. From 200 to 3500 standard cubic feet of hydrogen per barrel of aromatic extract is used. In the first treatment the hydrofined aromatic extract of catalytic cycle stock was heat treated for 13 hours at 750° F. A distillate fraction boiling between about 650° and 900° F. at atmospheric pressure was recovered as a pyrolysis product and labelled "Distillate from A." A portion of distillate A was subjected to pyrolysis, i.e. heat treated, for 22.5 hours at 750° F. A fraction boiling between about 650° and 900° F. was recovered from the pyrolysis product of Distillate from A and labelled "Distillate from B."

The decomposition rates of the aromatic extract of the catalytic cycle stock (Extract A), distillate from "A" (B) and distillate from "B" were calculated for a 1013 megawatt (thermal)=300 mw. (electrical power reactor) for core temperatures of 600° F., 650° F., 700° F., and 750° F. This refers to a nuclear reactor which is producing 1013 megawatts of heat. This heat is used to make steam which operates turbines to run generators which produce about 300 megawatts of electricity. The amount of moderator-coolant in the calculation was assumed to be 190,000 gallons with 160,000 gallons in the core. Although current reactor temperatures are in approximately the 675° F. range, it is envisioned that reactors will be designed with higher core temperatures as the limitations of the structural materials of construction are eliminated or made less severe. The decomposition rates of the above materials on the basis of weight percent per hour are tabulated in the following table. The decomposition rates of a commercial mixture of terphenyl isomers is also included for comparison.

*Table I*

DECOMPOSITION RATES OF ORGANIC MODERATOR-COOLANTS

[1013 megawatt (t.) reactor; 190,000 gal. total coolant; 160,000 gal. in core]

| Moderator-Coolant | Decomposition Rates (wt. percent/hr.) at Temp. (° F.) of— | | | |
| --- | --- | --- | --- | --- |
| | 600° F. | 650° F. | 700° F. | 750° F. |
| Hydrofined Cycle Stock Extract (A) | [1] 0.0885 | [1] 0.148 | [1] 0.403 | [1] 1.54 |
| Distillate from "A" after Pyrolysis for 13 Hrs. at 750° F. (B) | | | | [2] 0.930 |
| Distillate from "B" after Pyrolysis for 22.5 Hrs. at 750° F | | | | [2] 0.279 |
| Commercial mixture of terphenyl isomers | 0.0713 | 0.0719 | 0.74 | 0.815 |

[1] The decomposition rates for extract (A) at 600° F., 650° F., 700° F. and 750° F. were calculated as follows. A portion of extract (A) was heat soaked for 24 hours at 200 p.s.i.g. and then distilled to recover a fraction boiling within the boiling range of extract (A) prior to heating. The quantity of this fraction was mathematically subtracted from the starting quantity of extract (A) to obtain a figure representing total decomposition. The total decomposition figure divided by the number of hours heat soaking and the starting quantity of extract (A) gave a thermal decomposition rate. It had been observed that radiolytic decomposition rates are substantially independent of both temperature and the type of organic material subjected to radiation. Therefore a rate of radiolytic decomposition observed for terphenyl isomers was added to the above thermal decomposition rate to arrive at a figure expressing total decomposition rates.

[2] The decomposition rates at 750° F. for distillate from "A" and distillate from "B" were calculated in somewhat the same manner except that the thermal decomposition rate was determined by gas make, that is the amount of gas evolved from the distillate from "A" and the distillate from "B" after a 24-hour heat soaking at 200 p.s.i.g. It had been observed that the amount of gas evolved from hydrocarbons of this type bears a constant relationship to the amount of high boiling, e.g. over about 1100° F. materials formed by thermal decomposition. This thermal decomposition rate was determined by the gas make and combined with the radiolytic decomposition rate at this temperature to arrive at a figure expressing a total decomposition rate.

As can be seen in the 750° F. column, the aromatic extract of hydrofined cycle stock is markedly improved in thermal stability after the second pyrolysis treatment and at the temperature of 750° F. approximates the thermal stability of the commercial mixture of terphenyl isomers. All the temperatures above, unless otherwise stated, are at 200 p.s.i.g. pressure.

What is claimed is:

1. In a process wherein power is generated in a nuclear reactor and wherein neutrons are released during said power generation and wherein a fluid is placed in said reactor and wherein said fluid attenuates the speed of neutrons in said reactor and wherein said fluid cools some part of said reactor, the improvement which comprises using as said fluid, a moderator-coolant produced by:
    (I) Heat soaking a hydrofined highly aromatic hydrocarbon extract of a catalytic cycle stock to produce a heat soaked product consisting of a quantity of unwanted higher boiling degradation product and a heat resistant moderator-coolant fluid boiling in the range of from 600° to 1100° F.,
        (a) said heat soaking being done at a temperature of from 500° to 1100° F. and a pressure of from 0 to 1,000 p.s.i.g. for a period of from 0.5 to 72 hours,
        (b) said highly aromatic extract having been hydrofined to reduce its sulfur content and having a boiling range of from 600° to 1100° F., and
        (c) at least a portion of said unwanted higher boiling degradation product being formed during said heat soaking,
    (II) Removing said unwanted degradation product boiling above 1100° F. from said heat resistant moderator coolant, said heat resistant moderator coolant boiling in the range of from 600° to 1100° F.

2. A process for preparing a heat resistant moderator-coolant fluid for nuclear reactors which comprises:
    (I) Heat soaking a highly aromatic hydrocarbon extract of a catalytic cycle stock to produce a heat soaked product consisting essentially of a quantity of unwanted higher boiling degradation product and a heat resistant moderator-coolant fluid boiling in the range of from 600° to 1100° F.,
        (a) said heat soaking being done at a temperature of from 500° to 1100° F. and a pressure of from 0 to 1,000 p.s.i.g. for a period of from 0.5 to 72 hours,
        (b) said highly aromatic extract having a boiling range of from 600° to 1100° F., and
        (c) at least a portion of said unwanted higher boiling degradation product being formed during said heat soaking,
    (II) Removing said unwanted degradation product boiling above 1100° F. from said heat resistant moderator coolant, said heat resistant moderator coolant boiling in the range of from 600° to 1100° F.

3. A process as defined in claim 2, wherein the moderator coolant thus obtained is subjected to an additional heat soaking and separation sequence, thereby obtaining a more stable product.

4. Process for preparing a heat-resistant moderator-coolant hydrocarbon liquid for nuclear reactors which comprises:
    (I) heat soaking a hydrofined highly aromatic hydrocarbon extract of a catalytic cycle stock to evolve gas and to produce a heat soaked product consisting essentially of a quantity of unwanted higher boiling degradation product and a heat-resistant moderator-coolant liquid boiling in the range of 650° to 900° F.,
        (a) said heat soaking being done at a temperature of from 600° to 800° F. under a pressure from 0 to 1000 p.s.i.g. for a period of from 12 to 50 hours,
        (b) said highly aromatic hydrocarbon extract having been hydrofined to reduce its sulfur content and having a boiling range of from 650° to 900° F., and
        (c) at least a portion of said unwanted higher boiling degradation product being formed during said heat soaking;
    (II) removing said unwanted degradation product boiling above 900° F. from the resulting heat-resistant moderator-coolant, said heat-resistant moderator-coolant boiling in the range of from 650° to 900° F.

5. A heat-resistant moderator-coolant composition obtained according to the method of claim 4 boiling in the range of 650° to 900° F., said heat-resistant coolant being characterized by its higher thermal stability compared to the stability of the hydrofined aromatic extract which is not heat soaked.

References Cited by the Examiner

UNITED STATES PATENTS

| | | | |
|---|---|---|---|
| 2,160,136 | 5/39 | Frolich | 208—87 |
| 2,266,360 | 12/41 | Edwards et al. | 208—14 |
| 2,374,102 | 4/45 | Jahn et al. | 208—87 |
| 2,768,119 | 10/56 | Nash | 208—22 |
| 3,008,895 | 11/61 | Hansford et al. | 208—87 |
| 3,071,629 | 1/63 | White et al. | 208—87 |

FOREIGN PATENTS 831,369    3/60    Great Britain.

OTHER REFERENCES

E. Clar: Bis-peri-Phenylenenaphthalene, Nature, vol. 166, pp. 1075–6, December 23, 1950.

Melpolder et al.: Composition of Naphtha From Fluid Catalytic Cracking, Industrial and Engineering Chemistry, vol. 44, pp. 1142–46, 1952.

Klemm et al.: Synthesis and Ultraviolet Spectra of Eight Naphthylcycloalkenes, Journal of Organic Chemistry, vol. 24, pp. 949–51, July 1959.

ALPHONSO D. SULLIVAN, *Primary Examiner.*